J. TURCK 2,989,640

AUTOMATIC OPTICAL REMOTE-CONTROL DEVICE
FOR REMOTE-GUIDED MACHINES

Filed June 22, 1956

INVENTOR:
JEAN TURCK
By Mafuell E. Sparrow
ATTORNEY

June 20, 1961  J. TURCK  2,989,640
AUTOMATIC OPTICAL REMOTE-CONTROL DEVICE
FOR REMOTE-GUIDED MACHINES
Filed June 22, 1956  7 Sheets-Sheet 5

Fig.12

United States Patent Office

2,989,640
Patented June 20, 1961

2,989,640
AUTOMATIC OPTICAL REMOTE-CONTROL DEVICE FOR REMOTE-GUIDED MACHINES
Jean Turck, Cachan, France, assignor to Etablissements Jean Turck, Cachan, France, a French company
Filed June 22, 1956, Ser. No. 593,097
Claims priority, application France June 24, 1955
7 Claims. (Cl. 250—203)

The present invention relates to the remote-control of remote-guided self-propelled machines and in particular guided missiles which are controlled from a firing control station and directed onto a fixed or mobile objective or target.

Machines of this kind are already known which are provided with piloting servomotors to which the control signals are transmitted from a fixed transmitting device through conductors which connect the machine to the transmitting device and are pulled along by the machine, this transmitting device being actuated by manual piloting control means (comprising, for example, a control column) controlled by a firing operator, this operator observing both the objective and the machine to be directed onto the latter.

It will be understood that the complexity of the operations required of the operator necessitates, above all if the objective is mobile, a rather extensive training, and experience has shown that notwithstanding such training the loss of machines failing to reach the objective is relatively high.

The object of the invention is to remedy this disadvantage or, in other words, to increase the firing precision by simplifying the work of the operator and reducing it to a mere operation of sighting the objective. This is achieved, according to the invention, by arranging that the control means "take the teleguided machine in charge," these means being so arranged as to automatically maintain the machine on the line of sight of the sighting means which the operator moves in azimuth and elevation so as to keep them set on the objective. In other words, according to the invention, the operator (hereinunder termed the chief firer) is no longer concerned with the piloting of the guided machine after it has been launched on with its position.

The automatic optical remote-control device for remote-guided machines of the invention comprises, mounted on a common stand, a main sight and preferably a magnifying binocular sight which is capable of pivoting about vertical and horizontal axes, an electronic camera (with its electronic apparatus) associated with the sight so that the optical axes of the sight and of the camera remain parallel to one another, this camera comprising photoelectric means sensible to the image, projected thereon, of the guided machine and being so arranged as to detect any angular error or deviation between the guided machine and the optical axis of the camera and to transmit through its electronic apparatus correcting signals which are a function of this deviation, a device transmitting remote control signals and receiving the correcting signals transmitted by the electronic apparatus of the camera, a manual piloting remote-control device also connected to the signal transmitting device and arranged to pilot the guided machine which has just been launched and bring it into the field of utilization of the electronic camera (which thereupon takes the guided machine in charge), and switching means for connecting the transmitting device firstly to the manual piloting remote-control device and then to the electronic camera so as to pass from manual control to automatic control as soon as the guided machine is situated in the field of utilization of the camera.

In a preferred embodiment, the new device is also characterized by the following features and combinations of the latter:

A wide angle orientable auxiliary sight is associated with the main sight so that the optical axes of the two sights remain constantly parallel to one another, and the auxiliary sight is placed in the vicinity of the manual piloting remote control device and advantageously comprises a reticule encompassed by a ring defining the field of utilization (the field in which the guided machine is taken in charge) of the electronic camera.

The electronic camera proper and its electronic apparatus are advantageously of the type described in the pending U.S. patent application Serial No. 568,832, the correcting signals transmitted to the device transmitting remote-control signals being collected at the output of phase discriminators of the electronic apparatus.

The switching means, ensuring the change over from manual control to automatic control, are of the automatic operation type controlled by the electronic apparatus of the camera in such manner that the guided machine is automatically taken in charge by the camera as soon as it appears in the field of utilization of the latter.

The electronic camera proper and the main sight are advantageously grouped in the form of a unit bodily orientable on the stand.

The auxiliary sight is connected to said unit by a parallelogram-shaped arrangement of articulated members ensuring that the optical axes of the apparatus remain parallel.

The structure comprising the sights, the camera and its electronic apparatus and the stand carrying these apparatus, is in the form of a cabinet having folding legs and two seats which may be folded away out of use for respectively the chief firer who operates the main sight (with the electronic camera), and an assistant, or pilot, in charge of the launching of the guided machine and its manual piloting until the machine enters the field of utilization of the camera, this cabinet containing, if desired, also the high-tension and low-tension power supply, the remote-control transmitting equipment, etc.

Further features and advantages of the invention will be apparent from the ensuing description with reference to the accompanying drawings of one embodiment to which the invention is in no way limited.

Figures 1, 2:
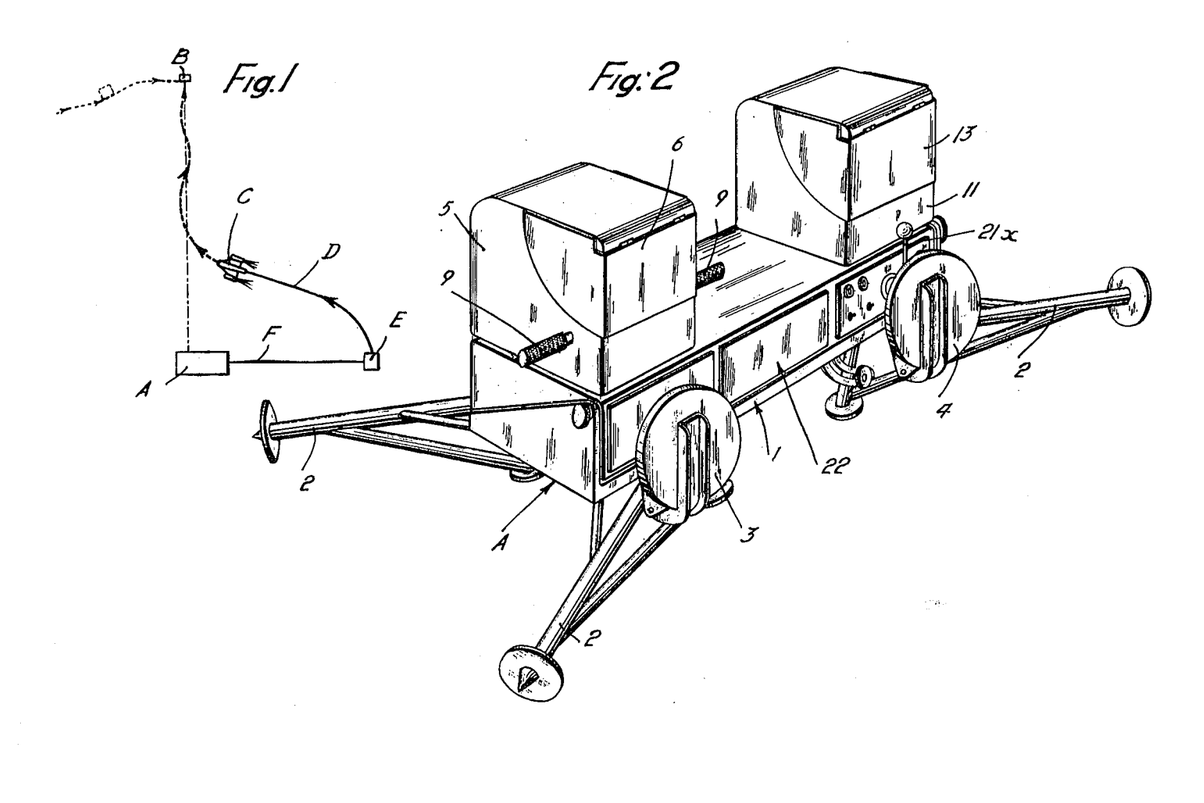
FIG. 1 is a general view showing the relative positions of an objective or target, the automatic optical remote-control device, the launching site of the guided machines and a guided machine travelling toward the objective.
FIG. 2 is a perspective view of the remote-control device in condition for transportation.
Figure 3:
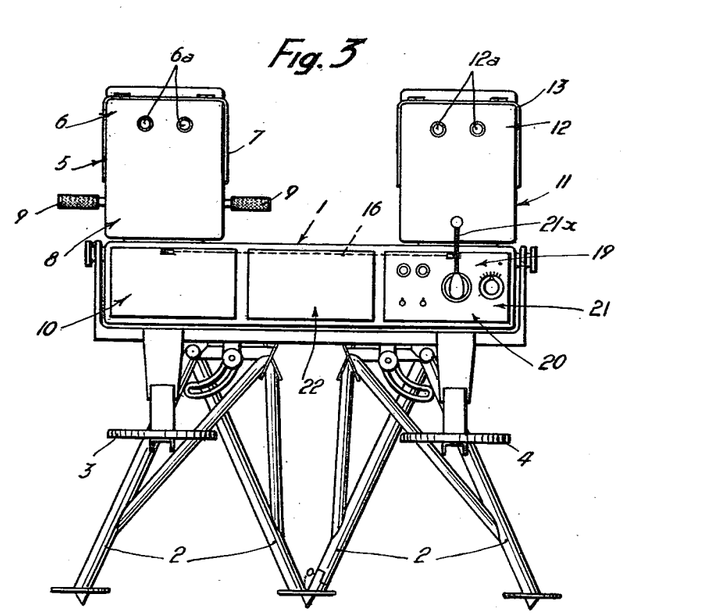
FIG. 3 is a rear elevational view of the remote-control device in condition for use.
Figure 4:
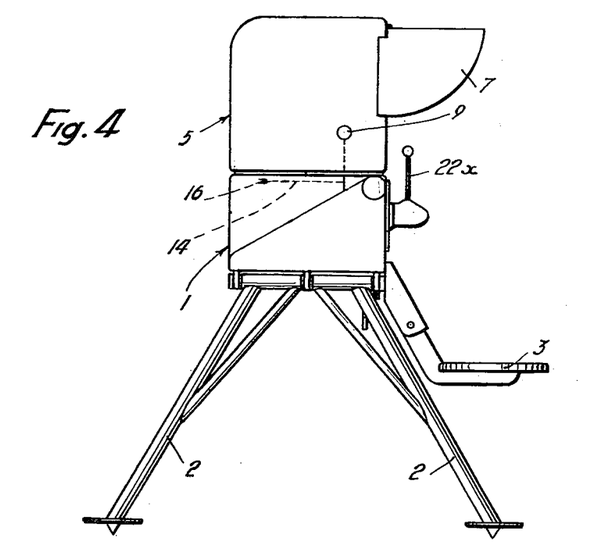
FIG. 4 is an end view thereof.
Figure 5:
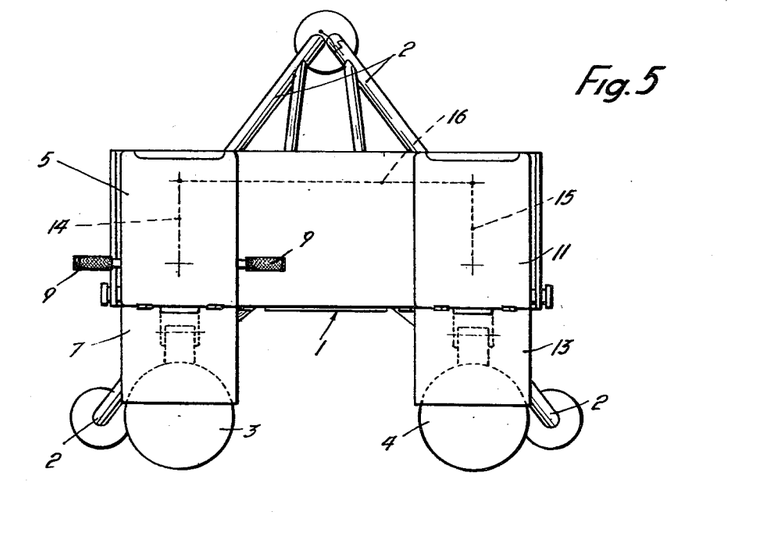
FIG. 5 is a plan view thereof.

With reference to FIG. 1, A denotes the automatic optical remote-control device embodying the invention, B the target or objective, C the guided machine connected to free conductors D which are unreeled from a reel situated at the launching site E (batteries of guided machines) and are connected to the cables F leading from the device A.

As is seen in FIGS. 2 to 5, the device A comprises a stand 1 in the form of a cabinet to which are pivoted legs 2 capable of being folded upwardly so as to permit the unit to be transported. Also pivoted to the stand 1 are two raisable seats 3 and 4 provided for the chief firer and his assistant (pilot) respectively.

Mounted on the stand 1 in front of the seat 3 is a block 5 which is orientable in vertical and horizontal planes, this block enclosing at its upper part binoculars 6 whose eye-pieces 6a may be protected (during transportation) by a hood 7 pivoted to the block 5 and capable of being swung closed. The electronic camera 8 (described hereinunder) is disposed in the lower part of the block 5. Two shifting handles 9 rigid with the block 5 permit shifting the block in azimuth and in elevation.

The electronic apparatus 10 of the camera is disposed in a compartment of the stand 1 immediately below the block 5.

Mounted on the stand 1 in front of the seat 4 is a block 11 orientable in azimuth and in elevation and whose upper part encloses an auxiliary wide angle sight 12 whose eyepieces 12a may be protected, during transportation, by a hood 13 pivoted to the block 11 and capable of being swung closed.

Figure 14:
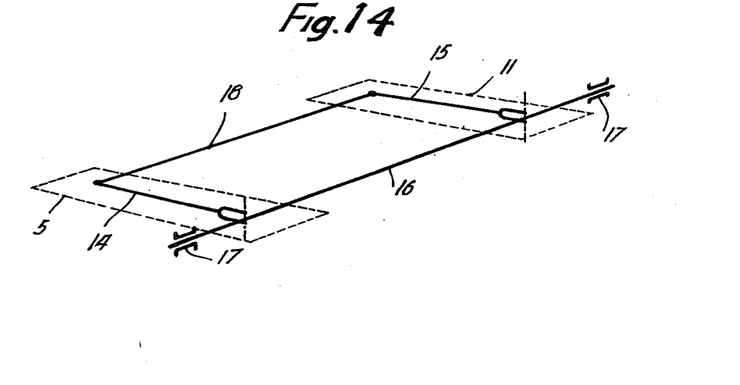
FIG. 14 is a diagram of the mechanical connecting means which ensure that the optical axes of the auxiliary sight, the main sight and the electronic camera remain parallel.

The optical axes of the elements 5, 8 and 12 may be maintained parallel by a parallelogram-shaped structure of articulated members shown in FIG. 14 (or by any other means giving the same result).

Figures 10, 13:
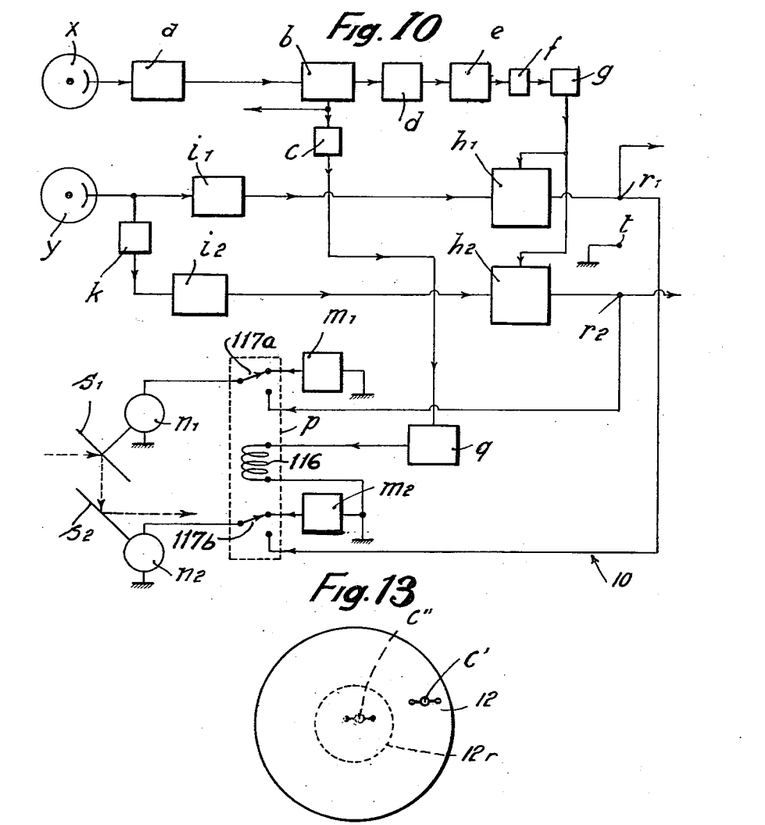
FIG. 10 is a block diagram of the component elements of the electronic camera.
FIG. 13 represents the field of the wide angle auxiliary sight with the circle defining the field of utilization of the camera.

In FIG. 10, the two blocks 5 and 11 are rigid with two levers 14 and 15 each of which is mounted to pivot about a vertical axis on a transverse shaft 16 journalled at 17 in the stand 1, the free ends of the levers 14 and 15 being interconnected by a connecting rod 18 so that the members 14, 15, 16, 18 form an articulated parallelogram-shaped structure.

Disposed in a compartment of the stand 1 below the block 11 is a device 19 transmitting remote-control signals and the switch 20. Disposed on the stand 1 at the post of the assistant to the chief firer are manual piloting means 21 which may comprise a control lever 21x (control column).

The various electrical sources for the apparatus are housed in a central compartment 22 in the stand 1.

Figure 6:
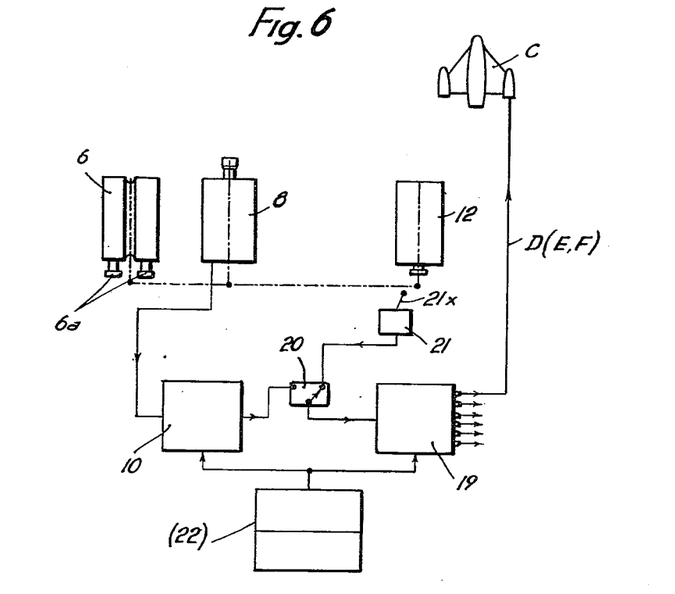
FIG. 6 is a block diagram of the various component elements of the remote-control device.

As can be seen from the diagram in FIG. 6, the signals detecting the error or deviation of the guided machine furnished by the electronic camera 8 are transmitted by the electronic apparatus 10 in the form of correcting signals to the transmitter 19 of the remote-control signals through the medium of the switch 20. The signals resulting from operation of the manual control lever 21x may be substituted for the signals from the transmitter 19 (upon departure of the guided machine) by means of the switch 20.

The electronic camera proper and the electronic apparatus associated therewith are advantageously of the type described in the aforementioned pending U.S. patent application Serial No. 568,832, although it should be understood that any other electronic camera and any other electronic apparatus giving the same result may be used.

It is recalled that such an electronic camera comprises an objective lens which projects the image of a target (in the present case, the flames issuing from the rocket motor propelling the guided missile C) onto a passive modulator behind which is located the photoelectric cell X, said modulator comprising radially directed opaque sectors alternating with non-opaque sectors. On the front of the passive modulator are located circular sweeping means which are so controlled as to produce a uniform circular movement of the image onto the said modulator.

The members of the camera are so arranged that, as the target is on the optical axis of the objective lens, the image of said target describes, on the modulator, a circumference the center of which is coaxial with the center of said modulator. The cell X delivers thus an alternating current having a fixed frequency.

But as soon as the target is not on the optical axis of the objective lens, the center of the circumference described by the image does not coincide with the center of the modulator. The cell X delivers thus an alternating current the frequency of which varies periodically around the aforesaid fixed frequency.

The detection of the frequency variations gives indications concerning the position of the target with respect to a reference axis (which is advantageously the optical axis of the objective lens of the camera).

Figure 7:
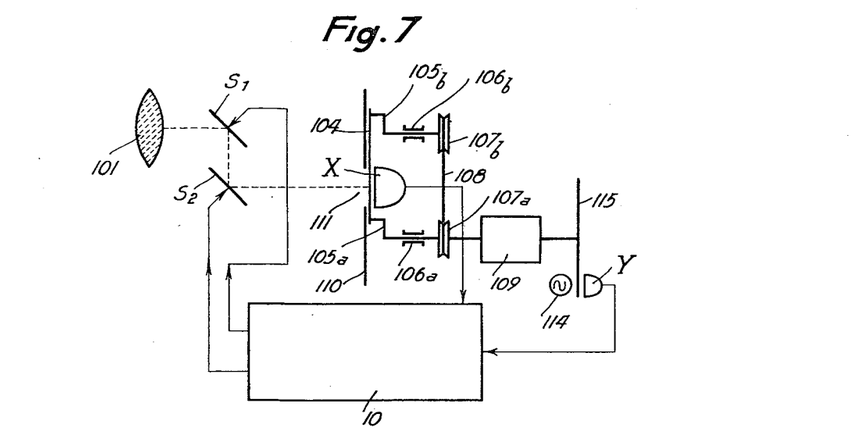
FIG. 7 is a diagrammatic assembly view of the electromechanical part of the electronic camera of the device.
Figure 8:
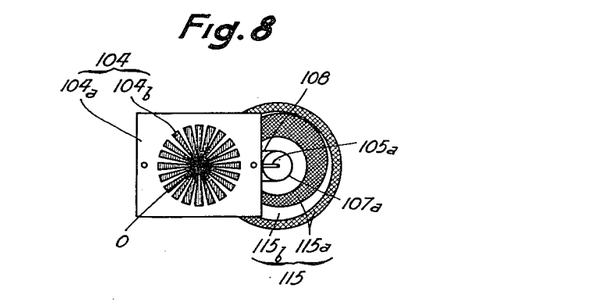
FIG. 8 is a front view of the movable passive modulator of the camera.

In order to render the description more clear, it will be supposed that the camera and the electronic apparatus are of the above-mentioned type, the theoretical diagram of the electronic apparatus being shown in FIG. 7.

In the embodiment shown in FIGS. 7 to 11, the camera comprises (see in particular FIGS. 7, 8, 9) an objective lens 101 co-operating with two movable mirrors $s_1$ and $s_2$ (arranged, in a known manner, to effect scannings in directions perpendicular to one another, that is to say to perform a sweeping across a surface), so as to project, on the surface of a passive modulator 104, the image of the object to be observed that is to say the image of the guided missile C. This passive modulator consists of a rigid flat transparent support 104a on which are disposed narrow opaque sectors 104b angularly spaced apart so as to constitute a radial system having alternately transparent and opaque elements.

The modulator 104 is supported by the crank-pins of two crank-arms 105a and 105b, which have the same length and are journalled at 106a and 106b respectively. The axes of the crank-arms 105a and 105b carry identical pulleys 107a and 107b interconnected by a belt 108. The crank arm 105a is driven by a constant-speed motor 109.

Figure 9:
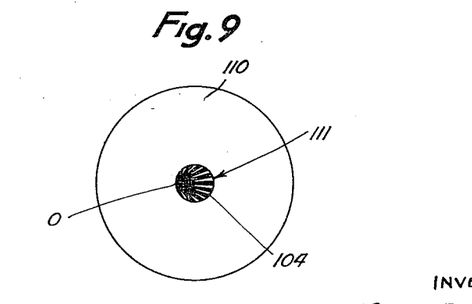
FIG. 9 is a front view of the large-scanning area of the camera.

Disposed in front of the modulator 104 is a large scanning area formed by a screen or diaphragm 110 provided with a central circular window 111 whose diameter is twice the radius of the crank-arms 105a and 105b, the arrangement being such that the periphery of the window 111, which in fact defines a small scanning area, is in axial alignment with the circular path described by the centre O of the modulator which undergoes a movement of circular translation while remaining parallel to itself; furthermore, the total distance between the elements 101–$s_1$–$s_2$–104 is substantially equal to the focal length of the objective lens 101.

Disposed behind the passive modulator 104 is a photoelectric cell $x$ connected to an electronic unit 10 which will be described in detail hereinafter.

It will be seen that, if the image projected on the modulator 104 strikes the centre of the small scanning area, the constant-speed circular translation of the modulator 104 causes a periodic excitation of the cell $x$ in accordance with a constant frequency. (Equal to the product of the number of opaque elements 104b of the modulator and the velocity of translation of the latter, that is, the rotational velocity of the crank-arms 105a, 105b.)

Now, if the image is projected outside the centre of the small scanning area (window 111) the frequency of excitation of the cell $x$ would no longer be constant but modulated about the constant value.

A fixed reference frequency is supplied to the device 10 by an alternating current generator comprising a photoelectric cell $y$ which receives a beam of light from a light source 114 of constant intensity through a modulating disk 115 driven by the motor 109, this disk comprising a crescent-shaped transparent zone 115$b$ bounded by two opaque zones 115$a$.

As represented on FIG. 10, the unit 10 comprises a pre-amplifier $a$ to which is connected the photo-electric cell $x$ of the electronic camera, the output thereof being connected to the input of an amplifier $b$ which is connected to a detector $c$ and a clipper $d$; following on this clipper are, in succession, a frequency discriminator $e$, a re-forming device $f$ for shaping the signals from the discriminator $e$ and a cathode-follower coupling device $g$. The frequency discriminator $e$ is so adjusted as to supply no voltage when the signals of the cell $x$ have a constant frequency.

The coupling device $g$ is shunt connected to two phase discriminators $h1$ and $h2$ to which are also supplied the signals modulated at the reference frequency produced by the photoelectric cell $y$. The reference signals are supplied to the phase discriminator $h1$ directly from an amplifier $i1$ and to the phase discriminator $h2$ through the medium of a phase shifter $k$ and an amplifier $i2$, the phase shifter $k$ being adjusted so as to phase shift the signals $\pi/2$.

Also incorporated in the electronic apparatus are two "search" oscillators $m1$ and $m2$ so arranged as to deliver scanning currents able to control the movable mirrors $s_1$ and $s_2$, so that the latter perform oscillations of relative great amplitude for sweeping the whole surface of the screen 110.

The oscillators $m_1$ and $m_2$ may be of any known type, for example of the type described in "Proceedings of the I.R.E.," volume 36, number 10, October 1948, pages 1302–1305 (P. G. Sulzer, "The tapered phase-shift oscillator").

The movable mirrors $s_1$ and $s_2$ are each controlled by driving means $n_1$ and $n_2$ supplied through a switch relay $p$, the control coil 116 of which is excited by the detector $c$ through an amplifier $q$. This coil actuates the movable brushes 117$a$ and 117$b$ to which the driving means $n_1$ and $n_2$ are connected.

The driving means $n_1$ and $n_2$ may be galvanometers having an elastic return frame when the follow-up is effected with non-zero error. The value of the angular position of the object (missile C) is then read of from the "centering" current in the galvanometers.

The driving means $n_1$ and $n_2$ may also consist of integrating fluxmeters having a free frame (without elastic return) when the follow-up is effected with zero error.

Linear control micromotors could also be used.

The value of the angular position is given by the angular displacement of the mirrors.

In the absence of a signal from the photoelectric cell $x$ (no missile in the field of the window 111), the control coil 116 of the switch relay $p$ is not energized (the devices $a$, $b$, $c$ and $q$ are at rest) and the brushes 117$a$, 117$b$ cooperate with the contacts connected to the large-area scanning oscillators $m_1$ and $m_2$. The mirrors $s_1$ and $s_2$ (whose movements are controlled by these oscillators) cause the light beam to scan the entire large scanning area, that is the screen 110. As soon as an object (missile C) appears and as soon as its image (provided by the objective lens 101), in the course of the large-area scanning produced by the oscillators $m_1$ and $m_2$, strikes the small scanning area defined by the window 111 in the screen 110, the signals supplied by the cell $x$ enter the amplifier $q$ through the detector $c$; this amplifier actuates the relay $p$ and the brushes 117$a$ and 117$b$ of the latter enter into contact with contacts connected to the phase discriminators $h_1$ and $h_2$.

When this occurs, the driving means $n_1$ and $n_2$ of the movable mirrors $s_1$ and $s_2$ so move the mirrors, under the control of the phase discriminators, as to maintain the image of the object automatically in the small scanning area (window 111).

If the image of the object (missile C) leaves the small scanning area, the cell $x$ no longer receives a signal and, as the coil 116 of the relay $p$ became non-energized, the mirrors are once again controlled by the large-area scanning oscillators $m_1$ and $m_2$, resulting in a scanning of the entire large scanning area 110.

Figure 11:
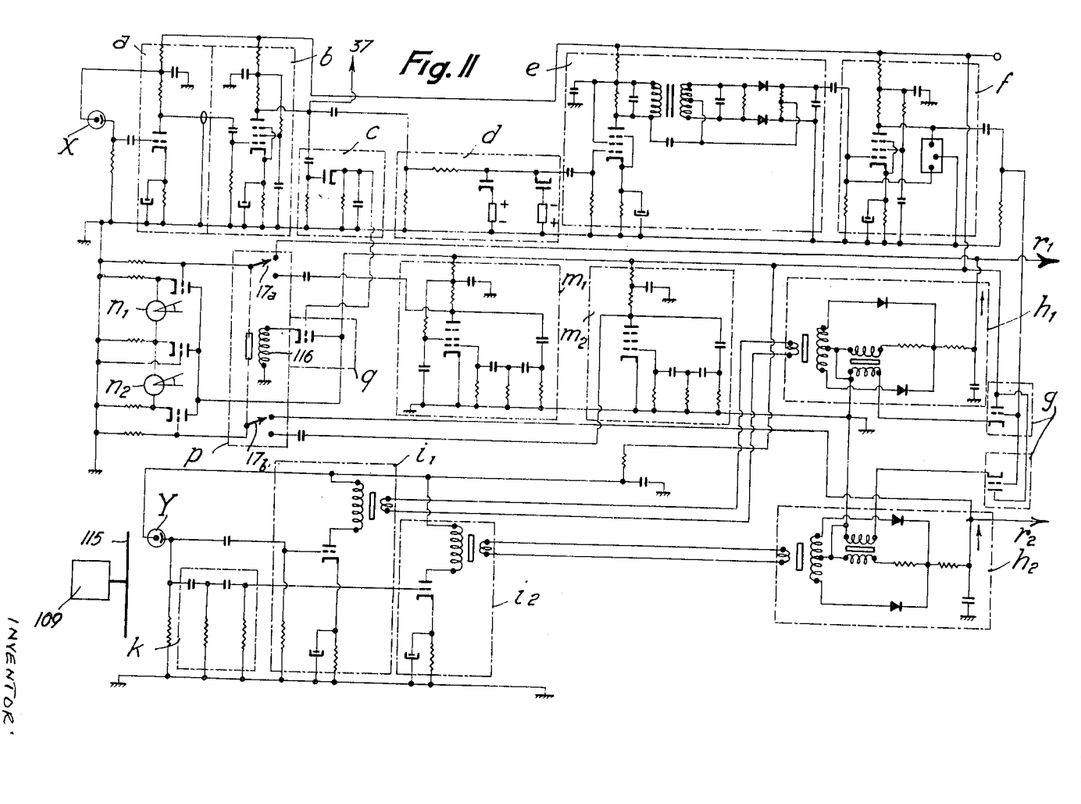
FIG. 11 is a complete electric diagram of the electronic part of the camera.

By way of example, a detailed diagram of the different elements shown in the block diagram of FIG. 10 have been shown in FIG. 11. In the latter, the same elements as those used in FIG. 10 have been designated by the same reference characters. As all the elements are constructed in a manner well known in the art, there is no need to describe them in detail, the diagram of FIG. 11 being sufficiently explicit.

It should be mentioned that the large-area scanning oscillators $m_1$ and $m_2$ are adapted to control the mirrors $s_1$ and $s_2$ (when they are connected to the driving means $n_1$ and $n_2$ of these mirrors) in such manner that the latter cause respectively a horizontal and vertical scanning of the large scanning area 110.

In the course of the actual scanning the electronic device 10 operates in the following manner:

If the image of the object (missile C) is formed exactly in the centre of the window 111, the uniform circular translation of the modulator 104 causes the cell $x$ to receive energy modulated at a constant frequency for each cycle of displacement of the modulator. The frequency discriminator $e$ is set to this constant frequency and therefore supplies no voltage to the phase discriminators $h_1$ and $h_2$ and the latter supply no voltage to the driving means $n_1$ and $n_2$ of the mirrors $s_1$ and $s_2$.

If the guided object (missile C) deviates from the reference axis so that the image is projected away from the centre of the window 111, in each scanning cycle (cycle of movement of the modulator 104), the cell $x$ receives energy modulated at a non-constant or modulated frequency and the discriminator $e$ supplies a certain voltage to the phase discriminators $h_1$ and/or $h_2$. But these phase discriminators also receive a reference frequency from the cell $y$, each period of this frequency corresponding to a complete cycle of movement of the modulator 104, since the light beam received by the cell $y$ is modulated by the disk 115 which rotates in synchronism with the crank-arms 105$a$ and 105$b$ that cause the movement of circular translation of the modulator 104. The voltages supplied by the cell $y$ and amplified by the amplifier $i$ are applied directly to the phase discriminator $h_1$ and are applied, shifted in phase $\pi/2$ by the phase shifter $k$, to the phase discriminator $h_2$. The said phase discriminators therefore have, at their outputs, voltages corresponding to the coordinates (along the X and Y axes) of the object (missile C) displaced relative to the optical axis of the objective lens 101. The voltages received at the terminals $r_1$ and $r_2$ are applied to the device 20 of FIG. 12.

In few words, it can be seen that a voltage provided by the phase discriminators $h_1$ and $h_2$, as soon as the luminous object at which the camera is aimed (in this case the flames issuing from the rocket motor or motors propelling the guided machine C) deviates from the optical axis of the camera and the amplifier $b$ provides a voltage as soon as the object enters the optical field of utilization of the camera, that is the window 111.

Many modifications of detail may be made in the apparatus shown in FIGS. 7 to 11. Thus the signals modulated at the reference frequency could be produced by two photoelectric cells angularly spaced 90° apart (instead of one cell $y$) which would permit eliminating the phase shifter $k$, each cell being associated with one of the phase discriminators.

Figure 12:
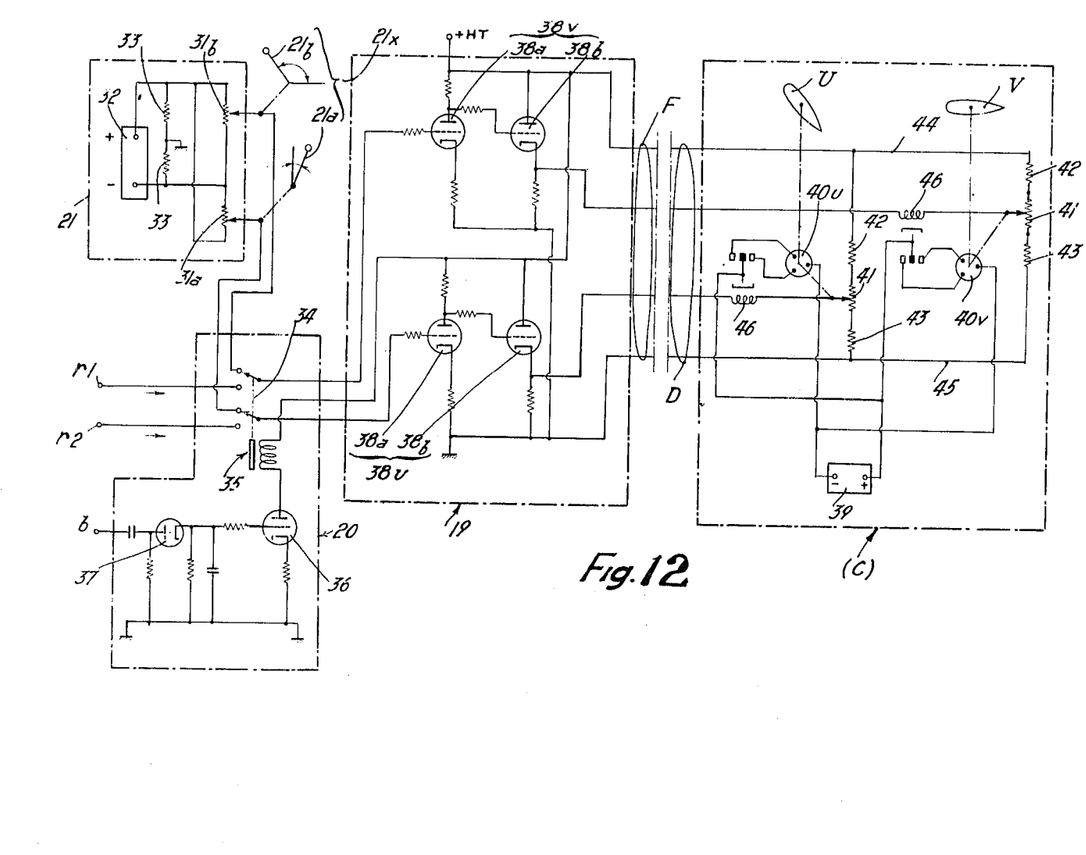
FIG. 12 is an electric diagram of the manual piloting device, the switching means, the remote-control signal transmitting device and the piloting servomotors carried by the guided machine.

In order to simplify the ensuing description, the control column 21x shown in FIG. 12 has been separated into two levers 21a and 21b for piloting in direction and altitude respectively (although in reality a single lever mounted by means of a universal joint permits this manual piloting). The two levers 21a and 21b control the sliders of two potentiometers 31a and 31b connected to the two poles of a source of current 32, the centre pole of which is earthed through the midpoint of a resistance 33. When the two levers are in a midway position the two sliders are therefore at zero potential (earth potential).

The sliders of the potentiometers 31a and 31b are connected to the two studs of a bipolar reversing switch 34 of an automatically controlled switching device 20, the two other studs of the reversing switch being connected to the terminals $r1$ and $r2$ of the electronic apparatus (FIGS. 7 to 11) of the camera.

The two blades or brushes of the reversing switch 34 are controlled by the coil 35 of an electromagnet disposed in the anode circuit of an amplifier tube 36 whose grid is coupled to the cathode of a detecting diode 37 controlled by the amplifier $b$ (FIGS. 7 to 11), the arrangement being such that as soon as the camera supplies a signal indicating that the guided machine is situated in the field of utilization of the camera, the blades of the reversing switch 34 (ordinarily placed on the studs leading to the potentiometer sliders of the unit 21) enter into contact with the studs connected to the electronic apparatus of the camera.

Each of the blades of the switch 34 is connected to the input of an amplifier chain 38u, 38v comprising a tube 38a connected as a direct current amplifier and a tube 38b connected as a cathode follower.

The two amplifier chains constitute the device 19 transmitting control signals.

The cathodes of the tubes 38b, earth and the positive terminal of the high-tension source of the device 19, are connected by multiple-conductor cables F, D to the receiving device mounted on the guided machine C and controlling the rudder control surfaces U and the elevator control surfaces B of this machine.

The receiver device comprises two reversible servo-motors 40u and 40v which are fed by a common battery 39. Each motor is mechanically connected to one of the control surfaces U and V and shifts the slider of a potentiometer 41 the resistance of which is connected, through two protecting resistances 42 and 43 respectively, to the high-tension conductor 44 and the earth conductor 45.

Connected to each of the sliders of the potentiometers 41 is one terminal of the coil 46 of a symmetrical polarized relay the other terminal of which is connected to the cathode of the corresponding tube 38b. The armature of each relay is connected to the positive terminal of the battery 39, the negative terminal of which is connected to each of the motors 40u and 40v. Each armature is capable of so co-operating with two contacts connected to the corresponding motor as to cause rotation of the latter in either direction.

If the coil 46 is not energized, the circuit of the corresponding motor is open. According to the position of the slider of the potentiometer 41 and according to the potential of this slider relative to the cathode of the corresponding tube 38b, a current traverses the coil 46 in one direction or the other, which causes the corresponding motor to rotate in one direction or the other. In rotating, this motor actuates the corresponding control surface of the guided machine and shifts the slider of the potentiometer 41 until the potentials at the two terminals of the coil 46 are equal, which causes the circuit of the motor to open so that the latter stops.

The device just described operates in the following manner:

Let it be assumed that the device A has been placed in such position that the objective to attain is situated within the possible angle of sweep or adjustment of the binoculars 6 and that the battery of guided machines with their individual cable reels has been placed at a certain distance from the device A and oriented in substantially the same direction as the latter.

The chief firer commences to observe the objective or target with his binoculars 6. Meanwhile, all the adjustive movements in azimuth and in elevation communicated by the chief firer to the binoculars 6 are also communicated to the camera 8 and to the auxiliary sight 12 whose optical axes are parallel to that of the binoculars. As soon as the chief firer has spotted the target, he maintains the binoculars 6 trained thereon and orders the launching of the guided machine C propelled by its rocket motors.

Once the guided machine has been launched, the pilot, assistant to the chief firer, controls or pilots the machine by means of the control column 21x so as to bring it first of all into the field of vision of the wide angle auxiliary sight 12.

During this time the reversing switch 34 of the switching device 20 is in such position that the device 19 transmitting remote-control signals is under the control of the manual control pilot device 21.

When the pilot perceives the image C' of the machine C in the field of vision of this sight 12 (FIG. 9), he pilots the machine in such manner that it is positioned within the circle 12r (C'' in FIG. 9) indicating the field of utilization of the camera 8.

As soon as the guided machine enters the aforementioned field, it is automatically taken in charge by the camera and the pilot need no longer follow it.

The flame of the propelling rocket motor or motors of the machine constitutes the light source to which the camera is responsive and as soon as the machine enters its field of utilization, the camera transmits a signal which is detected by the detector tube 37 which in turn immediately operates the reversing switch 34 so as to connect the telecontrol device 19 to the electronic apparatus of the camera (FIG. 10).

Henceforth, the electronic apparatus of the camera transmits correcting signals each time the guided machine has a tendency to deviate from the optical axis of the camera (this axis, apart from a very slight difference due to parallax, coincides with the optical axis of the binoculars 6).

These correcting signals, transmitted to the transmitting device which controls the piloting means of the machine C, are such that the latter is constantly brought back onto the line of the optical axis of the camera as soon as it tends to deviate therefrom.

Owing to the fact that this axis is substantially the same as that of the binoculars 6, the machine C moves along the latter axis and, as this axis intersects the objective or target, the machine is therefore directed onto the latter without it being necessary for the chief firer to effect any operation other than keeping his binoculars correctly trained on the objective.

It must be understood that the embodiment just described of the automatic optical remote-control device for guided machines has been given merely by way of example and many modifications and changes may be made therein without departing from the scope of the invention as defined in the appended claims. For example, certain devices or groups of devices may be replaced by others giving the same result.

Thus, the electronic camera and its electronic apparatus may be other than those above described so long as these apparatus are capable of transmitting correcting signals for compensating deviation from a reference axis and these signals are capable of use in automatic remote-control.

Similarly, the device 19 transmitting remote-control piloting signals, the switching device 20, the manual piloting device 21, the receiving means and servomotors carried by the guided machine C are not necessarily those described, provided that they perform the same functions and provide the same results.

It should be understood that the invention is not limited to the arrangement in which the machine C is connected to the transmitting device 19 by cable. This connection may be obtained by radio waves and the device 19 would be then arranged for transmitting radio signals, possibly frequency modulated, the guided machine C being equipped with a suitable radio receiver.

The machine C may also be provided, if it is of the type rotating about its longitudinal axis, with switch control means actuated by a gyroscope so as to alternate the function of the control surfaces for each quarter of a revolution of the machine.

The device of the invention may be provided with auxiliary means, such as a device for maintaining the gain of the electronic camera constant by varying the focal length of the objective (or by a potentiometer arrangement), this device being brought into operation by a time switch synchronized with the firing of the machine.

What I claim is:

1. An automatic optical remote-control device for remote guided machines including receiving means for receiving remote piloting signals, piloting means connected with said receiving means in order to be actuable by the latter and connecting means for connecting the receiving means to the device, said device comprising: an angularly movable main sight; an angularly movable electronic camera positively connected to the sight in order that its optical axis always remains parallel to the optical axis of said sight, sensible to the angular position of the remote-guided machines with respect to the optical axis of the camera and able to emit error signals as soon as any angular deviation occurs between the remote-guided machine and the optical axis of the camera; a hand actuable remote-control apparatus for generating hand produced deviation signals; and switching means inserted between the receiving means of the machine, the hand actuable remote-control apparatus and the electronic camera for connecting said receiving means selectively to the hand actuable remote-control apparatus, so long as the guided machine is not in the field of utilization of the electronic camera, and to said camera when the guided machine is in the field of utilization of the electronic camera.

2. An automatic remote-control device as claimed in claim 1, further comprising an electronic unit inserted between the electronic camera and the switching means for emitting deviation signals which are a function of the error signals emitted by the electronic camera.

3. An automatic remote-control device as claimed in claim 2, further comprising, inserted between the switching means and the connecting means ending at the receiving means of the guided machine, an amplifying transmitting device for transmitting remote-control amplified piloting signals when it receives either deviation signals coming from the electronic unit or hand produced deviation signals coming from the hand actuable remote-control apparatus.

4. An automatic remote-control device as claimed in claim 1, wherein the main sight is a magnifying binocular sight.

5. An automatic remote-control device as claimed in claim 1, further comprising a wide angle auxiliary sight, angularly movable and positively connected to the main sight, so that the optical axis of both sights remain parallel to one another.

6. An automatic remote-control device as claimed in claim 2, wherein the switching means are connected to the electronic unit in such manner as to be automatically controlled thereby, whereby the guided machine is automatically taken in charge by the electronic camera as soon as it appears in the field of utilisation of the latter.

7. An automatic remote-control device as claimed in claim 1, wherein the main sight and the electronic camera are grouped in the form of a unit orientable bodily.

References Cited in the file of this patent

UNITED STATES PATENTS

| | | |
|---|---|---|
| 2,404,942 | Bedford | July 30, 1946 |
| 2,588,382 | Hammond | Mar. 11, 1952 |
| 2,604,601 | Menzel | July 22, 1952 |
| 2,629,289 | Hunter | Feb. 24, 1953 |
| 2,792,190 | Seibold | May 14, 1957 |

FOREIGN PATENTS

| | | |
|---|---|---|
| 339,479 | Italy | Apr. 22, 1936 |